US010838421B2

(12) United States Patent
Huang et al.

(10) Patent No.: US 10,838,421 B2
(45) Date of Patent: Nov. 17, 2020

(54) AUTONOMOUS DRIVE SYSTEM

(71) Applicant: DENSO CORPORATION, Kariya (JP)

(72) Inventors: Minglei Huang, Farmington, MI (US); Yu Yan, Novi, MI (US); Hiroshi Inou, West Bloomfield, MI (US)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 15/892,534

(22) Filed: Feb. 9, 2018

(65) Prior Publication Data

US 2019/0250620 A1    Aug. 15, 2019

(51) Int. Cl.
| | |
|---|---|
| G08G 1/16 | (2006.01) |
| G05D 1/02 | (2020.01) |
| G05D 1/00 | (2006.01) |
| G08G 1/01 | (2006.01) |

(52) U.S. Cl.
CPC ......... *G05D 1/0214* (2013.01); *G05D 1/0061* (2013.01); *G05D 1/0088* (2013.01); *G05D 1/0285* (2013.01); *G08G 1/0116* (2013.01); *G08G 1/16* (2013.01)

(58) Field of Classification Search
CPC .. G05D 1/0214; G05D 1/0061; G05D 1/0088; G05D 1/0285; G08G 1/0116; G08G 1/16
See application file for complete search history.

(56) References Cited

U.S. PATENT DOCUMENTS

| | | | | |
|---|---|---|---|---|
| 6,898,513 B2* | 5/2005 | Blumbergs | ............ | G01C 21/26 701/301 |
| 9,260,059 B2 | 2/2016 | Rayes et al. | | |
| 9,836,962 B1* | 12/2017 | Hayward | ............... | B60K 35/00 |
| 9,905,133 B1* | 2/2018 | Kumar | .................... | G07C 5/008 |
| 10,042,359 B1* | 8/2018 | Konrardy | ............. | B60W 30/12 |
| 10,249,194 B2* | 4/2019 | Erickson | ............... | G08G 1/0112 |
| 10,399,445 B2* | 9/2019 | Yellambalase | .......... | B60L 53/60 |
| 10,529,221 B2* | 1/2020 | Jarrell | .................... | G08B 25/08 |

(Continued)

FOREIGN PATENT DOCUMENTS

JP    2010055333 A    3/2010

OTHER PUBLICATIONS

Wei et al., Towards a viable autonomous driving research platform, 2013, IEEE, p. 763-770 (Year: 2013).*

(Continued)

*Primary Examiner* — McDieunel Marc
(74) *Attorney, Agent, or Firm* — Harness, Dickey & Pierce, P.L.C.

(57) ABSTRACT

An autonomous drive system for a vehicle. The system has an autonomous drive module configured to pilot the vehicle. A control module monitors operating performance of the autonomous drive system. A location module identifies the vehicle's location. A transmitter/receiver communicates with a high risk location monitoring module at a location remote to the vehicle. When the control module determines that performance of the autonomous drive system is below a predetermined performance threshold, the control module retrieves the vehicle's location from the location module and transmits the vehicle's location to the high risk location monitoring module, which records the vehicle's current location to notify other vehicles that autonomous drive issues may occur at the vehicle's location.

20 Claims, 3 Drawing Sheets

(56) References Cited

U.S. PATENT DOCUMENTS

| | | |
|---|---|---|
| 2010/0010742 A1 | 1/2010 | Mochizuki |
| 2017/0021764 A1* | 1/2017 | Adams .................. G07C 5/0841 |
| 2018/0299284 A1* | 10/2018 | Wang ............... G08G 1/096775 |
| 2019/0193737 A1* | 6/2019 | Likhachev ........... G05D 1/0289 |
| 2020/0082726 A1* | 3/2020 | Kumar ................... G07C 5/008 |

OTHER PUBLICATIONS

Ansari et al., A Runtime Integrity Monitoring Framework for Real-Time Relative Positioning Systems Based on GPS and DSRC, 2014, IEEE, p. 980-992 (Year: 2014).*

Karim et al., A low cost obstacle avoiding autonomous vehicle with Global Positioning System, 2017, IEEE, p. 1-4 (Year: 2017).*

Kasper et al., Sensor-data-fusion for an autonomous vehicle using a Kalman-filter, 2008, IEEE, p. 1-5 (Year: 2008).*

* cited by examiner

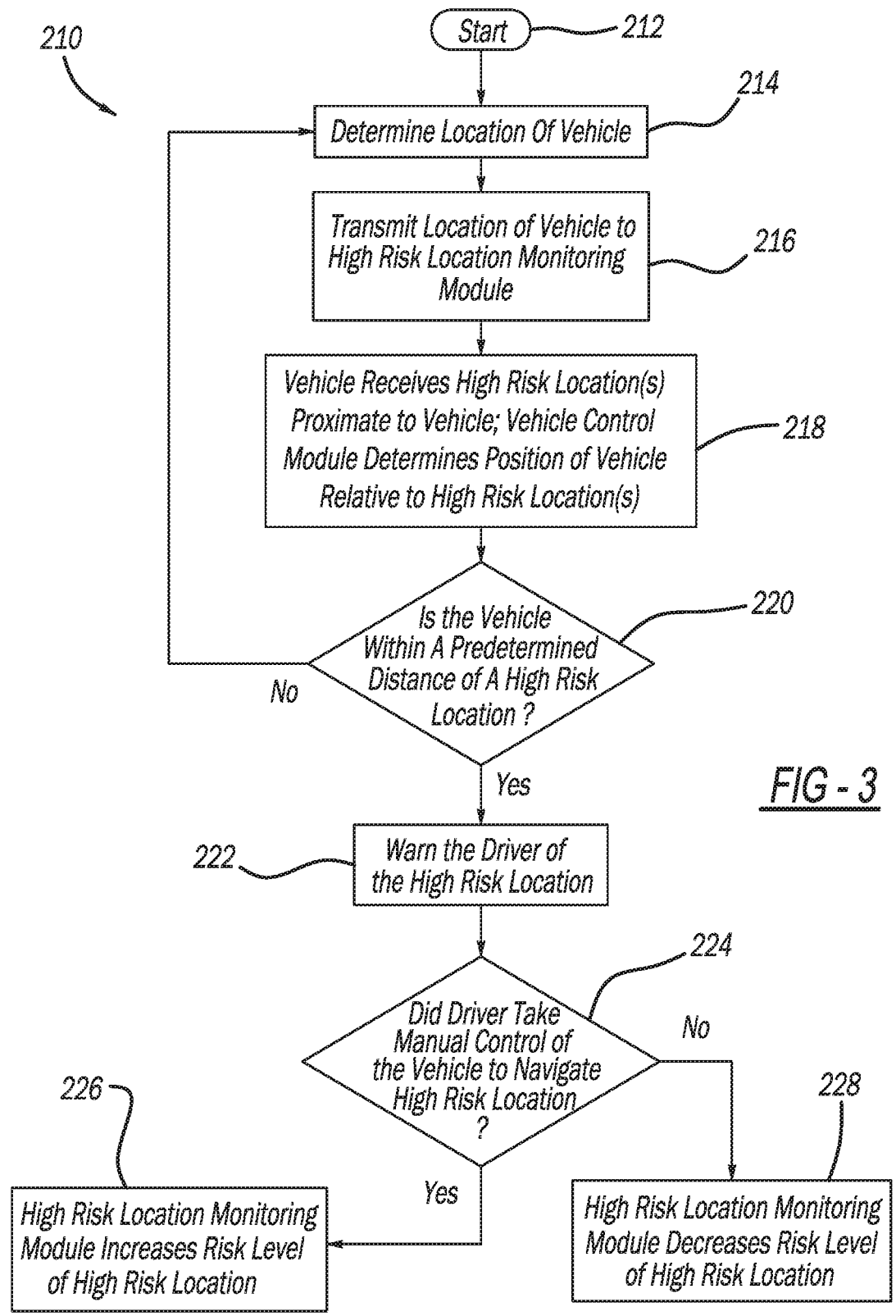

AUTONOMOUS DRIVE SYSTEM

FIELD

The present disclosure relates to autonomous drive systems for vehicles.

BACKGROUND

This section provides background information related to the present disclosure, which is not necessarily prior art.

The Society of Automotive Engineers (SAE) classifies autonomous drive (AD) systems into a variety of different categories based on functionality. Some AD systems are very basic, purely independent automated components (such as adaptive cruise control and emergency braking systems). Other more advanced AD systems are fully terrain-independent autonomous driving systems. A major difference between the basic and complex AD systems is that with the complex AD systems the responsibility to monitor current driving conditions is transferred from the driver to the autonomous drive system. Such complex AD systems must notify the driver when he or she needs to take control of the vehicle, such as due to an issue with the AD system. While existing AD systems are suitable for their intended use, they are subject to improvement. For example, there is a need in the art for an AD system having an improved driver warning system, which warns the driver when he/or she must take control (or may have to take control) of the vehicle due to an issue with the AD system. The present disclosure includes AD systems having improved warning systems, which provide the advantages set forth herein, as well as numerous others.

SUMMARY

This section provides a general summary of the disclosure, and is not a comprehensive disclosure of its full scope or all of its features.

The present disclosure includes an autonomous drive system for a vehicle. The system has an autonomous drive module configured to pilot the vehicle. A control module is configured to monitor operating performance of the autonomous drive system. A location module is configured to identify the vehicle's location. A transmitter/receiver is configured to communicate with a high risk location monitoring module at a location remote to the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 illustrates another method in accordance with the present disclosure for notifying a driver that he/she may need to take control of the vehicle from the autonomous drive system.

Corresponding reference numerals indicate corresponding parts throughout the several views of the drawings.

DETAILED DESCRIPTION

Example embodiments will now be described more fully with reference to the accompanying drawings.

Figure 1:
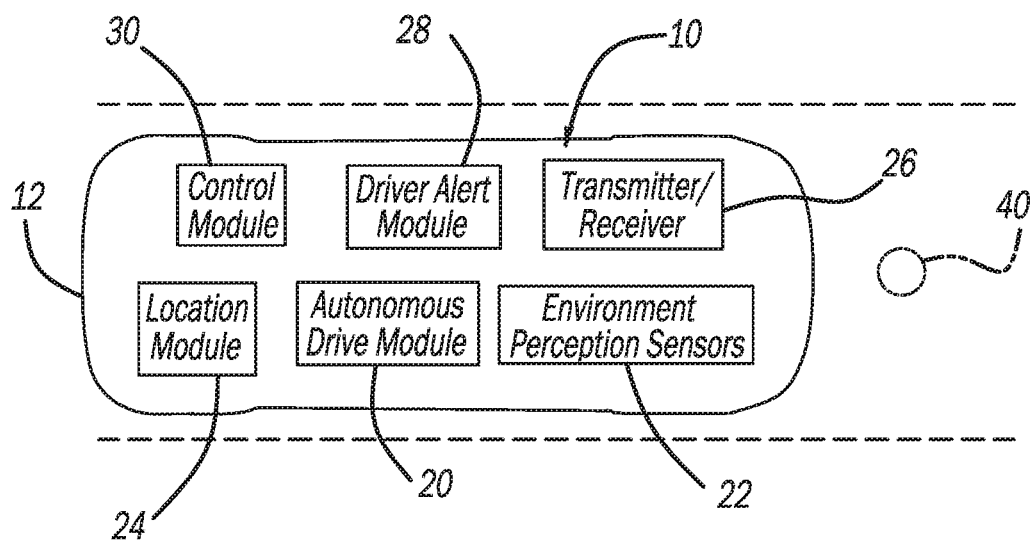
FIG. 1 illustrates an exemplary vehicle including an autonomous drive system in accordance with the present disclosure.
Figure 1:
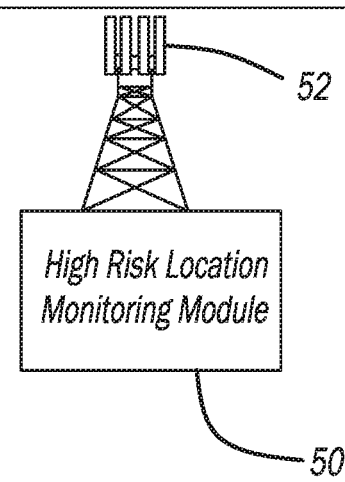

FIG. 1 illustrates an autonomous drive system 10 in accordance with the present disclosure as installed in an exemplary vehicle 12. The vehicle 12 may be any vehicle suitable for being outfitted with an autonomous drive system for autonomously driving the vehicle and monitoring driving conditions without input from the driver. The vehicle 12 may be any suitable passenger vehicle, utility vehicle, commercial vehicle, recreational vehicle, mass transit vehicle, motorcycle, military vehicle/equipment, construction vehicle/equipment, etc.

In the example illustrated, the autonomous drive system 10 generally includes an autonomous drive module 20, environment perception sensors 22, a location module 24, a transmitter/receiver 26, a driver alert module 28, and a control module 30. Each of these components of the autonomous drive system 10 will now be described in detail.

In this application, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The autonomous drive module 20 is configured to pilot the vehicle 12 without input of an operator of the vehicle 12. Thus the autonomous drive module 20 is configured to at least accelerate, decelerate, and steer the vehicle 12 to drive the vehicle 12 to a desired location. The autonomous drive module 20 is in communication with the environment perception sensors 22 in order to receive data from the sensors 22 regarding the environment about the vehicle 12 so as to safely and successfully pilot the vehicle 12 to a destination. The environment perception sensors 22 are any sensors configured to sense/perceive/detect features of the environment about the vehicle 12, such as roadway boundaries, lane markers, other vehicles, pedestrians, buildings, tunnels, bridges, weather conditions, road conditions, and any other obstacles about the vehicle 12. The environment perception sensors 22 can include any suitable radar sensor, LIDAR sensor, sonar sensor, cameras, etc.

The autonomous drive system 10 further includes a location module 24. The location module 24 is configured to identify the location of the vehicle 12 in any suitable manner. For example, the location module 24 can include a GPS receiver configured to receive signals from GPS satellites, and determine the location of the vehicle 12 based on the signals. The location module 24 may also be a combined GPS and IMU (inertial measurement unit) sensor. The location of the vehicle 12 can be transmitted by the transmitter/receiver 26, which can be any suitable transmitter/receiver, such as for radio frequency transmission and reception. The transmitter/receiver 26 includes any suitable antenna mounted at any appropriate location about the vehicle 12.

Figure 2:
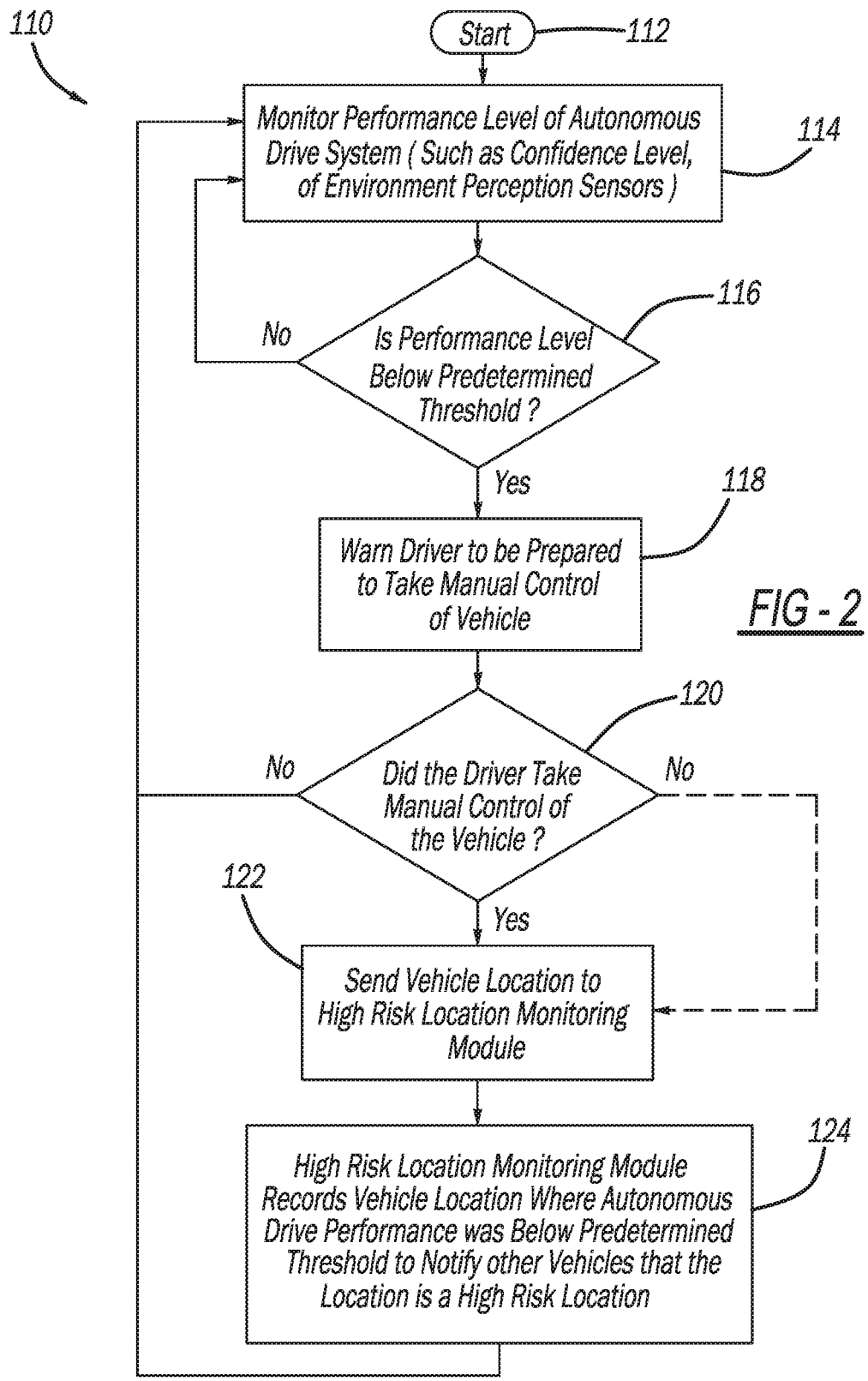
FIG. 2 illustrates a method in accordance with the present disclosure for notifying a driver that he/she may need to take control of the vehicle from the autonomous drive system.

The control module 30 is configured to operate various aspects of the autonomous drive system 10, examples of which will now be described in detail. With reference to FIG. 2 and reference numeral 110, the control module 30 is configured to start operation of the autonomous drive module 20 at block 112, such as when an operator of the vehicle 12 inputs a request for autonomous drive operation using any suitable HMI of the vehicle 12. At block 114, the control module 30 monitors performance of the autonomous drive system 10 to make sure that the system 10 is operating at or above a predetermined performance level. For example, the control module 30 is configured to monitor the environment perception sensors 22 to determine whether or not the environment perception sensors 22 are operating at a performance level that is at or above a predetermined performance threshold. When the control module 30 determines that one or more of the environment perception sensors 22 is unable to adequately sense/perceive/detect the environment, the control module 30 will conclude that the autonomous drive system 10 is operating below a particular predetermined threshold.

With reference to block 116, if the control module 30 determines that the performance level is not below a predetermined threshold, the control module 30 will continue to monitor performance of the autonomous drive system 10 at block 114. If at block 116 the control module 30 determines that the performance of the autonomous drive system 10 is below a predetermined threshold, at block 118 the control module 30 will activate the driver alert module 28 to warn the operator that he or she should be prepared to take manual control of the vehicle 12 because the autonomous drive system 10 may not be, or may soon may not be, able to operate at its full capacity to autonomously drive the vehicle 12. The driver alert module 28 may notify the driver using any suitable audible and/or visual alert.

At block 120, the control module 30 communicates with the autonomous drive module 20 to determine whether or not the driver assumed manual control of the vehicle 12. If the driver did not take manual control of the vehicle 12, the control module 30 can be configured to return to block 114, where the control module 30 will continue to monitor the performance level of the autonomous drive system 10. If the driver did take manual control of the vehicle 12, the control module 30 retrieves the location of the vehicle 12 from the location module 24 to identify the location where the performance level of the autonomous drive system 10 decreased below the predetermined threshold. The location where the performance level of the autonomous drive system 10 fell below the predetermined threshold is deemed a high risk location because at that location there is something that impairs autonomous drive systems. For example, at the high risk location could be one or more of the following: a tunnel; severe weather; mountain; bridge; building; construction; flooded roads; etc. A generic high risk location is illustrated in FIG. 1 at reference numeral 40.

At block 122, the control module 30 operates the transmitter/receiver 26 to transmit the location of the vehicle 12 (and thus the general location of the high risk location 40) to a high risk location monitoring module 50. In some applications, the control module 30 may send the location of the vehicle 12 to the high risk location monitoring module 50 regardless of whether or not the driver took manual control of the vehicle at block 120. The high risk location monitoring module 50 is at any suitable location remote to the vehicle 12, such as at a roadside monitoring station, or a vehicle safety center, which could be roadside or at any other suitable location. The high risk location monitoring module 50 is in communication with any suitable transmitter/receiver, such as the roadside transmitter/receiver 52 illustrated in FIG. 1.

At block 124 of FIG. 2, the high risk location monitoring module 50 records the location of the high risk location 40 (which is where, or proximate to where, performance of the autonomous drive system 10 fell below the predetermined threshold). The high risk location monitoring module 50 is configured to operate the transmitter/receiver 52 to transmit the location of the high risk location 40 to other vehicles to warn the other vehicles that their autonomous drive systems may experience reduced, or loss of, functionality when at, or proximate to, the high risk location 40.

With reference to FIG. 3 and reference numeral 210, additional features of the present disclosure will now be described. At block 212, the autonomous drive module 20 is activated to autonomously drive the vehicle 12. At block 214, the location module 24 determines the location of the vehicle 12 in any suitable manner, such as by GPS or a combination of GPS and IMU. At block 216, the control module 30 operates the transmitter/receiver 26 to transmit location of the vehicle 12 to the high risk location monitoring module 50. The high risk location monitoring module 50 identifies high risk locations where autonomous drive systems have been known to experience reduced functionality performance levels below predetermined thresholds (such as high risk location 40). The high risk location monitoring module 50 then transmits the locations of the coordinates of the high risk locations to the vehicle 12 for receipt by the receiver 26.

At block 218, the receiver 26 receives the nearby high risk locations. The control module 30 compares the location of the vehicle 12 to the coordinates of the high risk locations received from the high risk location monitoring module 50.

At block 220, the control module 30 determines whether the vehicle 12 is within a predetermined distance of one or more of the high risk locations. If the control module 30 determines that the vehicle 12 is not within the predetermined distance, the control module 30 will return to block 214 and continue to monitor the location of the vehicle 12 relative to high risk locations received from the high risk location monitoring module 50. When the control module 30 determines that the vehicle 12 is within the predetermined distance, at block 222 the control module 30 operates the driver alert module 28 to warn the driver of the vehicle 12 of the high risk location with any suitable audible and/or visual alert. This warning will allow the driver to prepare for possibly having to take manual control of the vehicle 12 should the autonomous drive system 10 experience reduced performance, such as below a predetermined performance level threshold.

At block 224, the control module 30 is configured to determine whether or not the driver took manual control of the vehicle at the high risk location, such as the high risk location 40. The control module 30 determines whether or not the driver took manual control in any suitable manner, such as by communicating with the autonomous drive module 20, and/or monitoring operation of the steering wheel, accelerator, and/or brake pedal of vehicle 12. The control module 30 is configured to then operate the transmitter 26 to transmit data to the high risk location monitoring module 50 indicating whether or not the driver took manual control.

With reference to block 226, if the driver took manual control, the high risk location monitoring module 50 increases the risk level of the particular high risk location (such as location 40) that caused the autonomous drive system 10 to suffer reduced performance, which resulted in the driver having to take manual control. If the driver determined that manual control was not necessary, at block 228 the high risk location monitoring module 50 decreases the risk level of the particular high risk location (such as location 40). Thus based on the actions of the driver of the vehicle 12, the high risk location information transmitted by the module 50 is updated in order to inform drivers of other vehicles of the risk level that the high risk location 40 is likely to present. For example, if the driver of the vehicle 12 did not find it necessary to take manual control, then other drivers encountering the high risk location 40 in the future are unlikely to need to take manual control either. In contrast, if the driver of the vehicle 12 was required to take manual control, then drivers encountering the high risk location 40 in the future will know based on the increased risk level that it will likely be necessary for them to take manual control, and thus can be prepared accordingly. The high risk location monitoring module 50 may be configured to transmit the location of a particular high risk location (such as location 40) after a predetermined number of drivers have had to take manual control. Conversely, the high risk location monitoring module 50 may be configured to no longer transmit the location of a particular high risk location (such as location 40) after a predetermined number of drivers have successfully navigated the location without taking manual control.

The present disclosure thus provides numerous advantages over the art. For example, the high risk location monitoring module 50 is configured to prepare a "risk map," which contains information regarding various high risk locations (such as location 40). The information is shared and maintained amongst all vehicles, such as by control modules 30 of various different vehicles. Whenever the autonomous drive system 10 of the various vehicles fails or experienced decreased performance (such as at tunnels, bridges, etc.), the details of the failure location is recorded and uploaded to the high risk location monitoring module 50. When a particular high risk location receives enough up-votes from other vehicles (i.e., enough autonomous drive systems 10 report that drivers took manual control in response to the high risk location), the location is updated into the "risk map." The risk map allows drivers to be notified before reaching a particular high risk location, as described above. In addition to the "risk map," which functions as prior information, the autonomous drive system 10 also advantageously monitors vehicle status by checking confidence of the components of the autonomous drive system 10, such as the environment perception sensors 22. If the confidence drops below a predetermined threshold, the system 10 advantageously notifies the driver so that the driver can be prepared to assume manual control of the vehicle. The present disclosure advantageously satisfies various SAE requirements, such as the SAE level 3 autonomous drive requirement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An autonomous drive system for a vehicle comprising:
   an autonomous drive module configured to pilot the vehicle;
   a control module configured to monitor operating performance of the autonomous drive system;
   a location module configured to identify the vehicle's location; and
   a transmitter/receiver configured to communicate with a high risk location monitoring module at a location remote to the vehicle, the high risk location monitoring module configured to generate a map identifying areas where the autonomous drive system is likely to experience decreased performance or fail;
   wherein when the control module determines that performance of the autonomous drive system is below a predetermined performance threshold, the control module is configured to retrieve the vehicle's location from the location module and transmit the vehicle's location to the high risk location monitoring module, which records the vehicle's current location to notify other vehicles that autonomous drive issues may occur at the vehicle's location.

2. The autonomous drive system of claim 1, wherein the autonomous drive module is configured to pilot the vehicle and monitor driving conditions without input from the driver when performance of the autonomous drive system is at or above the predetermined performance threshold.

3. The autonomous drive system of claim 1, further comprising:
   environment perception sensors configured to sense an environment about the vehicle;
   wherein the control module determines that performance of the autonomous drive system is below the predetermined performance threshold when one or more of the environment perception sensors is unable to sense the environment.

4. The autonomous drive system of claim 1, wherein the high risk location monitoring module is at a roadside location.

5. The autonomous drive system of claim 1, further comprising a driver alert module configured to alert a driver of the vehicle that the control module has determined that performance of the autonomous drive system is below the predetermined threshold.

6. The autonomous drive system of claim 5, wherein the alert is at least one of an audio alert and a visual alert.

7. The autonomous drive system of claim 1, wherein when the control module determines that performance of the autonomous drive system is at or greater than the predetermined performance threshold, the control module is configured to:
   obtain the vehicle's location from the location module;
   operate the transmitter/receiver to transmit the vehicle's location to the high risk location monitoring module;
   operate the transmitter/receiver to receive from the high risk location monitoring module high risk locations proximate to the vehicle, the high risk locations are locations where the autonomous drive system is expected to have a high risk of performing below the predetermined performance threshold;
   determine whether the vehicle is within a predetermined distance of one of the high risk locations; and
   warn the driver when the vehicle is within the predetermined distance of one of the high risk locations to prepare the driver for potentially having to take manual control of the vehicle from the autonomous drive system.

8. The autonomous drive system of claim 7, wherein the control module is further configured to:
   determine when the driver takes manual control, and when the driver does not take manual control, in response to the vehicle being proximate to one of the high risk locations; and
   control the transmitter/receiver to transmit data to the high risk location monitoring module indicating when the driver takes manual control, and when the driver does not take manual control, in response to the vehicle being proximate to one of the high risk locations.

9. The autonomous drive system of claim 8, wherein:
   when the driver takes manual control when the vehicle is proximate to the high risk location, the high risk location monitoring module classifies the high risk location at a higher risk level; and
   when the driver does not take manual control when the vehicle is proximate to the high risk location, the high risk location monitoring module classifies the high risk location at a lower risk level.

10. An autonomous drive system for a vehicle comprising:
   an autonomous drive module configured to pilot the vehicle;
   a location module configured to identify the vehicle's location;
   a transmitter/receiver configured to communicate with a high risk location monitoring module at a location remote to the vehicle, the high risk location monitoring module configured to generate a map identifying areas where the autonomous drive system is likely to experience decreased performance or fail; and
   a control module configured to:
      obtain the vehicle's location from the location module;
      transmit the vehicle's location to the high risk location monitoring module;
      receive from the high risk location monitoring module high risk locations proximate to the vehicle, the high risk locations are locations where the autonomous drive system is expected to have a high risk of performing below a predetermined performance threshold;
      determine whether the vehicle is within a predetermined distance of one of the high risk locations; and
      warn the driver when the vehicle is within the predetermined distance of one of the high risk locations to prepare the driver for potentially having to take manual control of the vehicle from the autonomous drive system.

11. The autonomous drive system of claim 10, wherein the control module is further configured to:
determine when the driver takes manual control, and when the driver does not take manual control, in response to the vehicle being proximate to one of the high risk locations; and
control the transmitter/receiver to transmit data to the high risk location monitoring module indicating when the driver takes manual control, and when the driver does not take manual control, in response to the vehicle being proximate to one of the high risk locations.

12. The autonomous drive system of claim 11, wherein:
when the driver takes manual control when the vehicle is proximate to the high risk location, the high risk location monitoring module classifies the high risk location at a higher risk level; and
when the driver does not take manual control when the vehicle is proximate to the high risk location, the high risk location monitoring module classifies the high risk location at a lower risk level.

13. The autonomous drive system of claim 10, wherein:
the control module is further configured to monitor operating performance of the autonomous drive system; and
when the control module determines that performance of the autonomous drive system is below a predetermined performance threshold, the control module is configured to retrieve the vehicle's location from the location module and transmit the vehicle's location to the high risk location monitoring module, which records the vehicle's current location to notify other vehicles that autonomous drive issues may occur at the vehicle's location.

14. The autonomous drive system of claim 13, wherein the autonomous drive module is configured to pilot the vehicle and monitor driving conditions without input from the driver when performance of the autonomous drive system is at or above the predetermined performance threshold.

15. The autonomous drive system of claim 14, further comprising:
environment perception sensors configured to sense an environment about the vehicle;
wherein the control module determines that performance of the autonomous drive system is below the predetermined performance threshold when one or more of the environment perception sensors is unable to sense the environment.

16. The autonomous drive system of claim 10, wherein the high risk location monitoring module is at a roadside location.

17. The autonomous drive system of claim 10, further comprising a driver alert module configured to warn the driver when the vehicle is within the predetermined distance of one of the high risk locations to prepare the driver for potentially having to take manual control of the vehicle from the autonomous drive system.

18. A method for autonomously operating a vehicle comprising:
obtaining the vehicle's location from a location module;
transmitting the vehicle's location to a high risk location monitoring module configured to generate a map identifying areas where the autonomous drive system is likely to experience decreased performance or fail;
receiving from the high risk location monitoring module high risk locations proximate to the vehicle, the high risk locations are where the autonomous drive system is expected to have a high risk of performing below the predetermined performance threshold;
determining whether the vehicle is within a predetermined distance of any one of the high risk locations; and
warning the driver when the vehicle is within the predetermined distance to prepare the driver for potentially having to take manual control of the vehicle from the autonomous drive system.

19. The method of claim 18, further comprising:
determining when the driver takes manual control of the vehicle, and when the driver does not take manual control of the vehicle, in response to the vehicle being proximate to one of the high risk locations; and
transmitting data to the high risk location monitoring module indicating when the driver takes manual control, and when the driver does not take manual control, in response to the vehicle being proximate to one of the high risk locations.

20. The method of claim 19, wherein:
when the driver takes manual control when the vehicle is proximate to the high risk location, the high risk location monitoring module classifies the high risk location at a higher risk level; and
when the driver does not take manual control when the vehicle is proximate to the high risk location, the high risk location monitoring module classifies the high risk location at a lower risk level.

* * * * *